United States Patent
Nishida et al.

[15] 3,677,622
[45] July 18, 1972

[54] LIGHT DEFLECTOR COMPRISING CASCADED LIGHT DISPLACEMENT MEANS AND HOLOGRAM PLATE

[72] Inventors: Nobuo Nishida; Mitsuhito Sakaguchi, both of Tokyo, Japan

[73] Assignee: Nippon Electric Co., Ltd., Tokyo, Japan

[22] Filed: Sept. 18, 1970

[21] Appl. No.: 73,457

[30] Foreign Application Priority Data

Sept. 25, 1969 Japan..................................44/75806

[52] U.S. Cl.................................................350/163, 350/3.5
[51] Int. Cl..................................................G02b 27/00
[58] Field of Search......................350/161, 163, 3.5, DIG. 2

[56] References Cited

UNITED STATES PATENTS 3,391,972   7/1968   Harris et al. ......................350/DIG. 2
3,540,791   11/1970  Caufield et al.........................350/3.5

OTHER PUBLICATIONS

Vitols, V.; " Hologram Memory for Storing Digital Data," IBM Technical Disclosure Bulletin; Vol. 8, No. 11, April 1966.
Harris et al., " Digital Laser Beam Deflection," Laser Focus, April 1967, Vol. 3, No. 7, pp. 26– 32.

*Primary Examiner*—David Schonberg
*Assistant Examiner*—Toby H. Kusmer
*Attorney*—Sandoe, Hopgood and Calimafde

[57] ABSTRACT

A deflector for deflecting an incident coherent light beam in a desired direction includes a recording plate in which an interference fringe pattern is recorded. A light beam displacement device is disposed in front of the recording plate to displace a coherent beam incident thereon to a desired path parallel to and displaced from the incident beam.

3 Claims, 5 Drawing Figures

Patented July 18, 1972  3,677,622

INVENTORS
NOBUO NISHIDA
MITSUHITO SAKAGUCHI by
Sandoe, Hopgood & Calimafde
ATTORNEYS

LIGHT DEFLECTOR COMPRISING CASCADED LIGHT DISPLACEMENT MEANS AND HOLOGRAM PLATE

The present invention relates generally to light deflectors, and particularly, to a light deflector having no mechanical driving parts, and yet having the capability of deflecting a light beam in a digital manner.

Mirrors are commonly used for light deflection in a great variety of applications. However, the use of a mirror for deflecting a beam into a desired direction requires a certain finite time due to the fact that the mirror includes mechanically movable parts. In addition, the deflection of the beam is carried out continuously, that is, when a light beam is reflected by a mirror, it is deflected from one direction to another direction, and the reflected light beam is made to swing in accordance with the mechanical movement of the mirror. Moreover, a quick and accurate deflection of a light beam by a mirror is not possible because the inertia of the mirror upon rotation has to be considered. Furthermore, in the deflection of a light beam from one direction to another, a locus of the light beam traveling from one direction to another direction occurs which leads to an undesirable result.

Because of these reasons, light deflectors using ultrasonic waves or the like, have been proposed for the purpose of deflecting the direction of a light beam without the use of mechanically movable parts, and also without swinging the light beam upon its deflection into a desired direction.

These light deflectors employing ultrasonic waves include a device to apply ultrasonic waves to a transparent medium to which a coherent beam is projected as an incident light. The frequencies of the ultrasonic waves are controlled and the direction of the coherent beam emitted from the transparent medium may be varied, as disclosed, for example, in an article by A. Koppel et al. entitled "A Television Display Using Acoustic Deflection and Modulation of Coherent Light" on page 1,429 et seq. of PROCEEDINGS OF THE IEEE, Vol. 54, No. 10, October 1966.

This ultrasonic device is an improvement over the conventional mirror light deflector since the locus of swing of the light path caused by the deflection does not remain, because the incident coherent beam can be deflected into any desired direction, and the deflection operation is extremely quick and accurate as no mechanically movable parts are utilized. However, the ultrasonic deflection device has a significant disadvantage in that the deflection angle cannot be chosen large (1° – 2° at the maximum).

It is an object of the present invention to provide a light deflector which can provide a large deflection angle which has no mechanically movable parts, and which can deflect a beam in a digital manner.

It is a further object of the invention to provide a high-speed, digital reflector for operation on incident coherent light beams.

One feature of the present invention is the provision of a light deflector for deflecting an incident coherent light beam to a desired direction, which comprises a recording plate having an interference fringe recorded therein for diffracting a coherent light beam projected as an incident light at each position on an incident plane. The light beams are emitted from the recording plate in a direction and pass through a single fixed point. A light displacement device is disposed in front of the recording plate for displacing a coherent beam projected thereon at a fixed incident position in a fixed direction without changing its direction, so as to displace only its optical path in parallel, to thereby project the coherent beam onto said recording plate at a desired position as an incident light.

Since the incident position of the coherent beam on the recording plate can be changed in a digital manner by the light displacement device, and since the incident coherent beam projected onto the recording plate at any position of incidence is emitted so as to always pass through one fixed point, it is possible in the light deflector of the invention to deflect the incident coherent beam into a desired direction in a digital manner.

To the accomplishment of the above and to such further objects as may hereinafter appear, the present invention relates to a light deflector substantially as defined in the appended claims and as described in the following specification taken together with the accompanying drawing in which:

Figure 1:
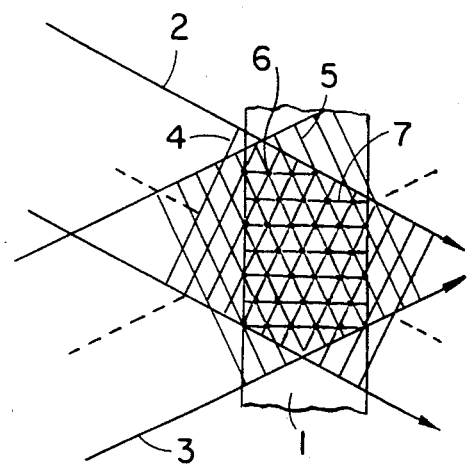
FIG. 1 is a diagram illustrating the principles of recording an interference fringe between two coherent light beams along the direction of the thickness of a recording plate.

In FIG. 1, a recording plate 1, such as a photographic plate, is shown in cross-section. When recording plate 1 is illuminated with two coherent light beams 2 and 3 having exactly the same wavelength such as, for example, laser light beams produced by the same oscillator, an interference fringe 7 is recorded in recording plate 1. More particularly, paying attention to a wavefront 4 of coherent light beam 2 and a wavefront 5 of coherent light beam 3 at a given moment at a cross point 6 between these wavefronts, light beams 2 and 3 are reinforced with one another and are thus recorded. It is thus seen that as wavefronts 4 and 5 advance, an interference fringe 7 is recorded along the axial direction of the thickness of recording plate 1. Obviously, the direction of interference fringe 7 is that direction obtained by dividing in half the angle formed by coherent light beams 2 and 3.

Figure 2:
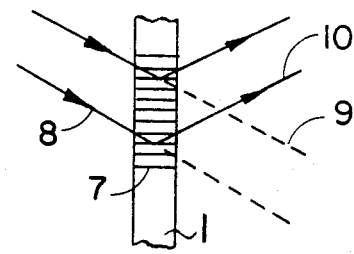
FIG. 2 is a diagram illustrating Bragg reflection by the use of the interference fringe recorded along the direction of the thickness of the recording plate of FIG. 1.

In FIG. 2, interference fringe 7 between coherent light beams 2 and 3 in FIG. 1 is recorded in recording plate 1. When a coherent light beam 8 is illuminated onto recording plate 1, if the direction of the light beam provided by recording plate 1 is different than the directions of coherent light beams 2 and 3 in FIG. 1, light beam 8 would pass through recording plate 1 without being affected by interference fringe 7 formed therein, and will be emitted as an outgoing light beam 9. If on the other hand, the direction of coherent light beam 8 is equal to the direction of coherent light beam 2 or 3 in FIG. 1, coherent light beam 8 is then subjected to Bragg reflection by interference fringe 7 at the position of recording plate 1, and is thereby emitted as an outgoing light beam 10.

If the direction of coherent light beam 8 coincides with the direction of coherent light beam 2 in FIG. 1, the direction of outgoing light beam 10 in FIG. 2 coincides with the direction of coherent light beam 3 in FIG. 1. While if the direction of coherent light beam 8 in FIG. 2 coincides with the direction of coherent light beam 3 in FIG. 1, the direction of outgoing light beam 10 in FIG. 2 coincides with the direction of coherent light beam 2. In this connection, it is essential that coherent light beam 8 have the same wavelength as coherent light beams 2 and 3 in FIG. 1.

From the above description with reference to FIGS. 1 and 2, it will be seen that if the interference fringe between coherent light beams 2 and 3 is recorded successively at the respective points on recording plate 1 while varying only the angle of incidence of coherent light beam 3 and maintaining the generating point of coherent light beam 3 at a fixed position without changing the angle of incidence onto recording plate 1 of coherent light beam 2, and if coherent light beam 8 is illuminated onto the thus produced recording plate from the same direction as coherent light beam 2 at the respective points on recording plate 1, the respective diffracted beams 10 are emitted from recording plate 1 as if they were emitted from a single point, that is, the position at which the coherent beam 3 was generated.

In addition, if the incident coherent light beam onto recording plate 1 is projected in the same direction as coherent light beam 8 but from the reverse side of recording plate 1 (along the dotted line 9 in FIG. 2), the diffracted light beam is then emitted in the direction of the opposite extension of coherent light beam 10. In other words, if the incident coherent light beam at this moment is disposed in parallel on recording plate 1, it will be seen that the respective diffracted light beams are emitted in a manner such that they all pass through one point, that is, the position at which coherent light beam 3 was generated. At this moment, since the emitted light beam has been only diffracted by the interference fringe in the recording plate, a phenomenon such as convergence would not occur in the light beam itself.

The present invention, which makes use of the above-described principles, is now described in connection with a preferred embodiment thereof illustrated in FIG. 3.

Figure 3:
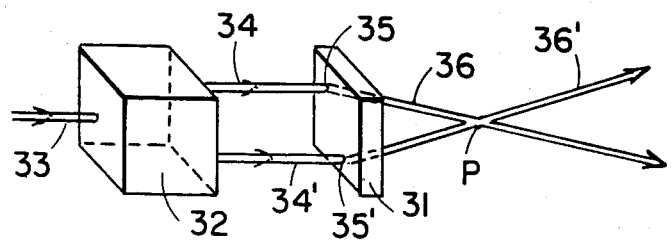
FIG. 3 is a schematic view illustrating the construction of a light deflector according to one embodiment of the present invention.

In FIG. 3, interference fringes different from each other are recorded at the respective points on a recording plate 31. As a result of these interference fringes, a coherent light beam projected onto recording plate 31 at any arbitrary point as an incident light beam in the fixed direction is diffracted into a direction to pass through a point P. A light displacement device 32 displaces in parallel the optical path of a coherent beam that is projected thereon as an incident light beam at a fixed position in a fixed direction without changing the direction of the incident coherent light beam, and then emits the displaced light beam.

Figure 5:
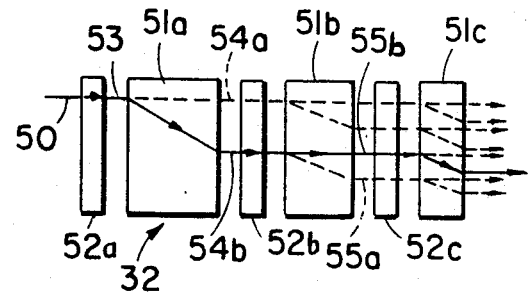
FIG. 5 is a schematic view showing the construction of a light displacement device which may be used to advantage in the embodiment of FIG. 3.

Light displacement device 32, as shown in FIG. 5, is constructed by arranging a number $n$ of double refractive medium bodies 51 such as, for example, calcite bodies, in a cascaded relationship. A corresponding number of optical switches 52 are disposed in front of each refractive body 51 to transfer the direction of polarization of the incident light beam 50. Switches 52 may, for example, include an $LiTaO_3$ element employed as an optical modulator as disclosed on pages 1,611 to 1,617 of the *Journal of Applied Physics*, Vol. 38, No. 4, issued Mar. 15, 1967. If the light beam 53 emitted from switch 52a and incident on the first double refractive medium body 51a is emitted from body 51a as a beam 54b according to the direction of polarization of the beam, then the light beam 54 is an incident light beam onto a second double refractive medium body 51b through a transfer switch 52b. At this moment, if the direction of polarization of the light beam is transferred by means of transfer switch 52b, a light beam is emitted from the second double refractive medium body 51b as a light beam 55a. However, if the direction of polarization of the beam is not transferred by transfer switch 52b, the beam is emitted from refractive body 51b as a light beam 55b. As a result, by means of one double refractive medium body, there exists the possibility of taking two different emitting positions with respect to a single incident light beam, according to the nature of that incident light beam. Consequently, if three double refractive medium bodies 51a, b and c, for example, are arranged in a cascaded relationship (corresponding to the case of $n=3$) and a corresponding number of transfer switches 51a, b and c are provided, then eight ($2^3$) emitting positions of the beam from body 51c can be taken, and by controlling transfer switches 52, it is possible to emit the light beam from any one position out of these eight emitting positions.

The number $n$ of double refractive medium bodies 51 to be used depends upon the number $m$ of the incident positions for the coherent light beam on the recording plate. More particularly, among the number $n$ satisfying the relation of $2^n \geq m$, the minimum natural number of $n$ is preferably chosen.

As will be obvious from the above description, if the light displacement device 32 illustrated in FIG. 5 is employed in the embodiment of FIG. 3, it is possible to project the incident light beam onto recording plate 1 at any desired position thereon. Therefore, according to the device illustrated in FIG. 3, if an incident coherent light beam 33 is projected onto recording plate 31, for example, as an incident light beam 34 by displacing only its optical path in parallel, beam 34 is diffracted by the interference fringe recorded in recording plate 31 at the incident position 35, and is thus emitted in the direction passing through a point P as an outgoing light beam 36. If the light beam is projected onto the recording plate 31 as an incident light beam 34' by controlling light displacement device 32 as described above, beam 34' is then emitted as a light beam 36' as a result of the diffraction effect caused by the interference fringe recorded at incident point 35' on recording plate 31. Outgoing light beam 36' also passes through the same point P. In other words, by controlling the incident position of the incident light beam onto recording plate 31 by the operation of light displacement device 32, the incident light beam can be deflected into light beams in various directions all passing through one particular point P.

Figure 4:
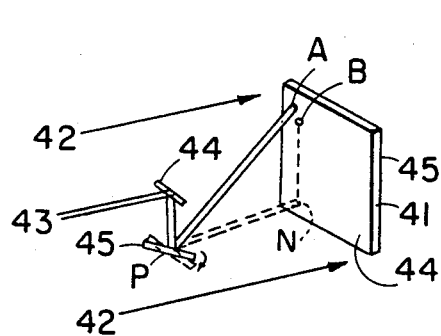
FIG. 4 is a view in schematic form illustrating a method for manufacturing the recording plate that may be used in the embodiment of FIG. 3.

FIG. 4 is a diagrammatic view showing one example of a method for manufacturing recording plate 1 used in the apparatus shown in FIG. 3. A recording plate 41, such as a photographic plate for recording the interference fringe, is illuminated over its entire surface by a reference coherent beam 41 always from a predetermined direction. A coherent light beam 43 having the same wavelength as reference light beam 42 is projected onto any arbitrary point on recording plate 41 by means of mirrors 44 and 45. In the embodiment shown in FIG. 4, it is assumed that mirror 44 is fixed while mirror 45 is movable. A point A on recording plate 41 is illuminated with light beam 43 to record at this point an interference fringe between reference coherent light beam 42 and coherent light beam 43. After this recording has been finished, movable mirror 45 is rotated so as to illuminate a point B on recording plate 41 with light beam 43, which results in the recording of an interference fringe between both coherent light beams in a similar manner as the first one. Subsequently, in the same manner, an interference fringe may be recorded over the entire surface of recording plate 41 by rotating movable mirror 45 to cause coherent beam 43 to be incident on different locations on plate 41.

If a coherent light beam having the same wavelength as reference light beam 42 is projected as an incident light onto recording plate 41 having the interference fringe recorded therein from the same direction as that of reference light beam 42, that incident light beam is diffracted by the interference fringe at the incident point, and a light beam is thereby emitted in the same direction as incident coherent light beam 43 at that incident point upon recording the interference fringe. Therefore, if the recording plate manufactured as shown in FIG. 4 is used as recording plate 31 in the embodiment of FIG. 3, so as to make its back side surface (surface 45 in FIG. 4) an incident surface of plate 31, it will be apparent from the preceding description that point P in FIG. 3 corresponds to the position of the reflecting point P of movable mirror 45 in FIG. 4.

In this connection, while the light beams on the out-going side of recording plate 31 are converged to pass through point P according to the embodiment of the present invention illustrated in FIG. 3, if recording plate 41 is used as recording plate 31 in FIG. 3 so as to place its front side surface (the surface 44 in FIG. 4) on the incident side, the light beams on the outgoing side are emitted in the directions diverging from point P, and therefore, even if the recording plate were used in such a mode, the effects and advantages of the present invention would not be reduced at all.

Thus while only a single embodiment of the present invention has been herein specifically described it will be apparent that modifications may be made therein without departing from the spirit and the scope of the invention.

We claim:

1. A light deflector for deflecting an incident coherent light beam into a desired direction comprising a hologram plate, said plate having recorded therein interference fringes between a narrow coherent light beam deflected in various directions from a fixed position and a wide coherent light beam in a fixed direction, said slate diffracting a coherent light beam incident on said hologram plate at each position on an incident plane in said fixed direction to emit a deflected light beam in a direction passing through a fixed point spaced from said hologram plate, and light displacement means disposed in front of said recording hologram plate for displacing a coherent light beam projected thereon at an incident position in said fixed direction without changing its direction so as to displace only its optical path in parallel to project said coherent light beam onto said hologram plate at a desired position thereon, whereby said coherent light beam may be deflected in a desired direction passing through said fixed point after passing through said hologram.

2. The light deflector of claim 1, in which said light displacement means comprises a plurality of cascaded double refractive members, and a corresponding plurality of optical switch means respectively interposed in front of each of said double refractive bodies.

3. The light deflector of claim 2, in which said optical switch means comprise means responsive to a control signal for varying the direction of polarization of a light beam incident thereon.

* * * * *